(12) United States Patent
Krupezevic et al.

(10) Patent No.: US 7,260,156 B2
(45) Date of Patent: Aug. 21, 2007

(54) MODULATION IDENTIFICATION DEVICE

(75) Inventors: Dragan Krupezevic, Stuttgart (DE);
Robert Morelos Zaragoza, Tokyo (JP);
Veselin Brankovic, Esslingen (DE);
Mohamed Ratni, Esslingen (DE)

(73) Assignees: Sony Corporation, Tokyo (JP); Sony Deutschland GmbH, Cologne (DE)

( * ) Notice: Subject to any disclaimer, the term of this patent is extended or adjusted under 35 U.S.C. 154(b) by 1329 days.

(21) Appl. No.: 09/892,919

(22) Filed: Jun. 26, 2001

(65) Prior Publication Data

US 2002/0041639 A1 Apr. 11, 2002

(30) Foreign Application Priority Data

Jun. 28, 2000 (EP) ................................. 00113679

(51) Int. Cl.
*H04L 27/04* (2006.01)
*H04L 27/12* (2006.01)
*H04L 27/20* (2006.01)

(52) U.S. Cl. ................... 375/295; 327/291; 332/106; 341/20; 341/173

(58) Field of Classification Search ............... 375/295, 375/321, 377; 455/67, 415, 463, 67.1, 67.4, 455/703; 327/291; 332/106; 341/20, 173
See application file for complete search history.

(56) References Cited

U.S. PATENT DOCUMENTS

| | | | |
|---|---|---|---|
| 4,437,173 A * | 3/1984 | Canel et al. ................. 365/193 |
| 5,636,250 A | 6/1997 | Scarpa ......................... 375/321 |
| 5,657,358 A * | 8/1997 | Panech et al. ............... 375/356 |
| 5,822,429 A * | 10/1998 | Casabona et al. ............... 380/9 |
| 5,917,415 A * | 6/1999 | Atlas .......................... 340/575 |
| 5,940,768 A * | 8/1999 | Thro et al. ................... 455/507 |
| 6,127,928 A * | 10/2000 | Issacman et al. ......... 340/572.1 |
| 6,230,319 B1 * | 5/2001 | Britt et al. ................... 717/173 |
| 6,272,336 B1 * | 8/2001 | Appel et al. ................. 455/423 |
| 6,285,881 B1 * | 9/2001 | Huang ......................... 455/434 |
| 6,337,888 B1 * | 1/2002 | Huang et al. ................ 375/322 |
| 6,522,869 B1 * | 2/2003 | Hiramatsu et al. ........ 455/127.2 |
| 6,529,566 B1 * | 3/2003 | Carsello et al. ............. 375/340 |
| 6,690,746 B1 * | 2/2004 | Sills et al. ................... 375/316 |
| 2001/0028607 A1 * | 10/2001 | Ashinuma .................... 369/14 |

FOREIGN PATENT DOCUMENTS

| | | |
|---|---|---|
| EP | 0 805 561 | 11/1997 |
| EP | 0 944 200 | 9/1999 |
| WO | WO99 33166 | 7/1999 |

* cited by examiner

Primary Examiner—David C. Payne
Assistant Examiner—Erin M. File
(74) *Attorney, Agent, or Firm*—Oblon, Spivak, McClelland, Maier & Neustadt, P.C.

(57) ABSTRACT

A modulation identification device can be used for detecting the modulation type of a wirelessly transmitted and modulated RF signal without a-priori information on the kind of modulation used. The modulation identification device (1) comprises a n-port junction (17), n being an integer equal to or larger than three. The n-port junction (17) is supplied with the modulated RF signal (2) and a second RF signal (3) from a local oscillator. The n-port junction (17) outputs at least one third RF signal to at least one power detector (18). A signal processing unit (6) processes the power detected output of the n-port junction (17) to generate at least one flag (10) indicating the identified modulation type.

13 Claims, 7 Drawing Sheets

Figure 1:
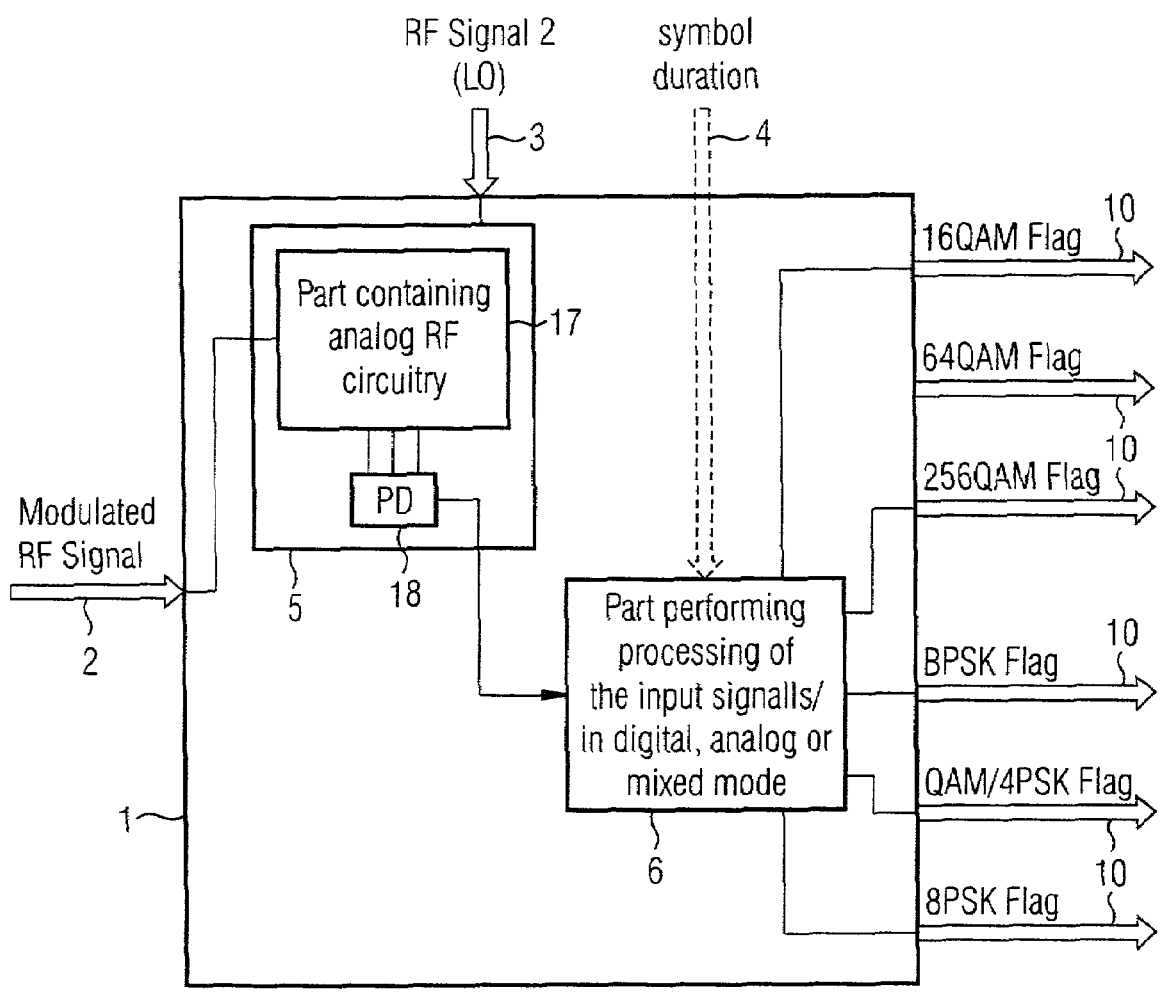

| 64QAM | | 16QAM | |
|---|---|---|---|
| $I/\bar{I}+Q/\bar{Q}i$ | $p_1/p_{10}$ | $I/\bar{I}+Q/\bar{Q}i$ | $p_1/p_{10}$ |
| 0.2500+0.2500i | 0.0476 | 0.5000+0.5000i | 0.2000 |
| 0.2500+0.7500i | 0.2381 | 0.5000+1.5000i | 1.0000 |
| 0.2500+1.2500i | 0.6190 | 1.5000+0.5000i | 1.0000 ($r_2$) |
| 0.2500+1.7500i | 1.1905 | 1.5000+1.5000i | 1.8000 ($r_1$) |
| 0.7500+0.2500i | 0.2381 | | |
| 0.7500+0.7500i | 0.4286 | | |
| 0.7500+1.2500i | 0.8095 | | |
| 0.7500+1.7500i | 1.3810 | | |
| 1.2500+0.2500i | 0.6190 | | |
| 1.2500+0.7500i | 0.8095 | | |
| 1.2500+1.2500i | 1.1905 | | |
| 1.2500+1.7500i | 1.7619 | | |
| 1.7500+0.2500i | 1.1905 | | |
| 1.7500+0.7500i | 1.3810 | | |
| 1.7500+1.2500i | 1.7619 ($r_2$) | | |
| 1.7500+1.7500i | 2.3333 ($r_1$) | | |

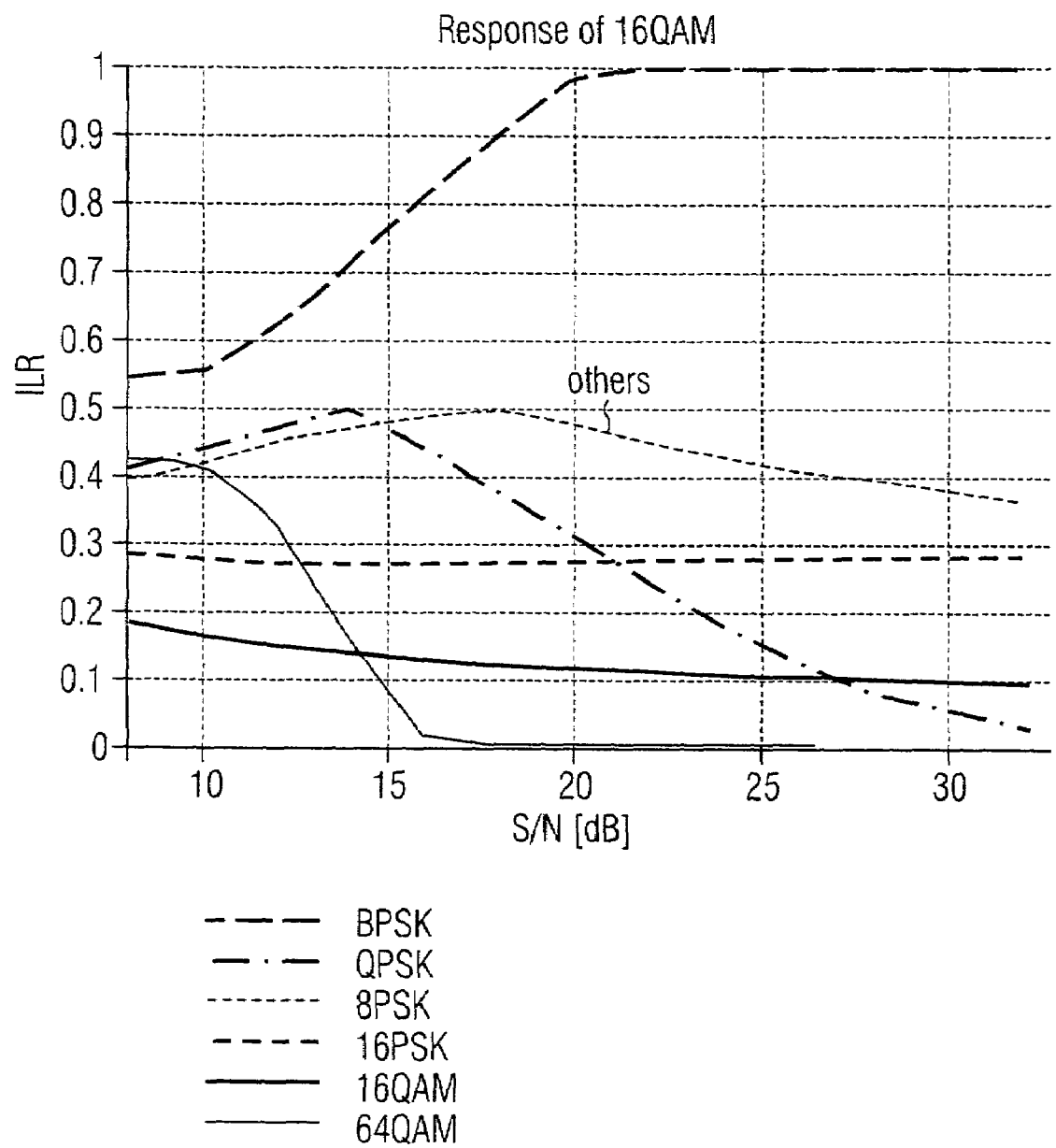

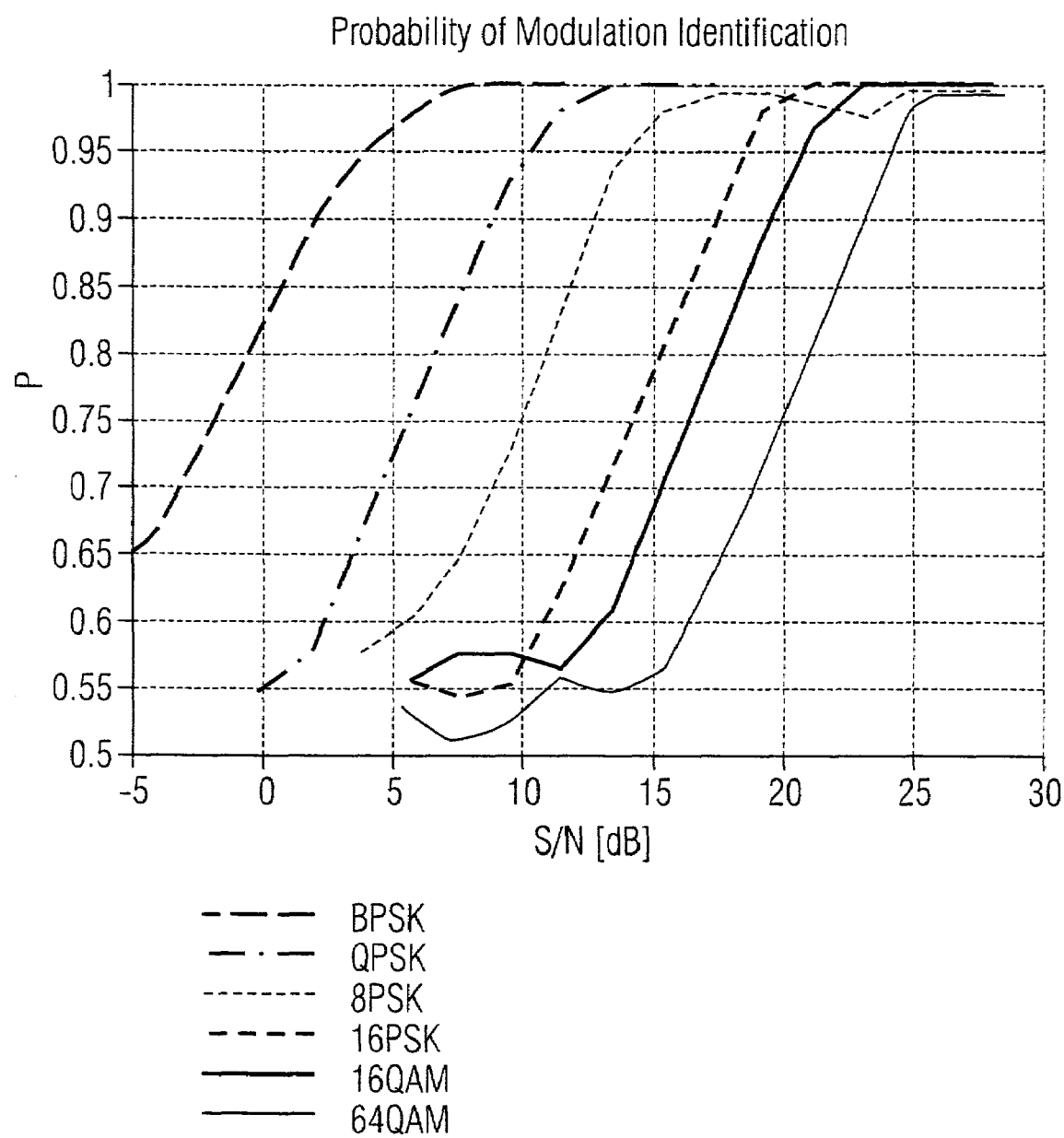

MODULATION IDENTIFICATION DEVICE

The present invention relates to a modulation identification device, to a software defined radio device as well as to a method for identifying the modulation type of wirelessly transmitted modulated RF signal.

Software defined radio (SDR) devices can be reconfigured (with software downloaded either over-the-air or locally) to operate over a wide frequency band and with a variety of digital modulation formats, such as M-array, phase-shift keying (M-PSK) or M-array quadrature-amplitude-modulation (M-QAM). It is therefore desirable to have methods for a detection of multiple digital modulations. Particularly, some SDR receivers may need to determine the type of modulation without any a-priori knowledge. Further information on software-defined radio can be found in J. Mitola, "The Software Radio Architecture", IEEE Communications Magazine, vol. 33, no. 5, pages 26 to 28, May 1995.

Therefore most recently, there has been a growing interest in digital modulation identification. Nandi et al, "Algorithms for Automatic Recognition of Communication Signals", IEEE Trans. Comm., vol. 46, no. 4, pages 431 to 436, April 1998 proposes two methods for modulation recognition. The first approach is "decision-theoretical" in the sense that it requires high-order moments of the amplitude, phase and frequency of the signals in order to extract the key features. The second method uses an artificial neural network. Both methods are solutions to a pattern recognition problem and require to process a large number of received symbols.

In view of the still growing need for modulation identification methods and devices, it is the object of the present invention to propose a technique for modulation identification on the basis of a less complicated procedure.

This object is achieved according to the present invention generally by using a n-port junction device being supplied with a modulated RF signal to be detected and a second RF signal (for example from a local oscillator). The n-port junction device combines in a linear manner (no RF mixing units) the two input RF signals and outputs at least one RF signal (being the result of the linear combination(s)) to at least one power detector.

The six-port technique has been known for its ability to accurately measure the scattering parameters, both amplitude and phase, of microwave networks. Instead of using heterodyne receivers a six-port receiver accomplishes direct measurements at microwave and mm-wave frequencies by extracting power levels at at least three and particularly four of the 6 ports. The imperfections of the hardware can be readily eliminated by an appropriate calibration procedure. Very accurate measurements can be made in a large dynamic range and wide frequency range. six-port junction receivers consist of passive microwave components such as directional couplers and power dividers as well as diode detectors. The circuit can be easily integrated as MHMIC or MMIC. The known receiver performs direct phase/amplitude demodulation at microwave and mm-wave frequencies.

By performing a calibration procedure the hardware imperfections such as phase error of the bridges, imbalance of the power detectors, etc. can be readily eliminated. This significantly eases the requirement of the hardware implementation and enables the six-port receiver to operate over a wide band up to mm-wave frequencies.

According to the above cited document of Bossisio et. al. a six-port receiver concept with power dividers and 90 degrees hybrid circuits realized in distributed technology is used. The application of that known structure lies mainly in the frequency bands above 10 GHz, however, it suffers from an insufficient band width of the operation due to the inherently frequency selective nature of the 90 degrees hybrid circuits.

From D. Maurin, Y. Xu, B. Huyart, K. Wu, M. Cuhaci, R. Bossisio "CPW Millimeter-Wave Six-Port Reflectometers using MHMIC and MMIC technologies", European Microwave Conference 1994, pp. 911-915, a wide-band topology for reflectometer used is known which is based on a distributing element approach featuring coplanar wave guide applications in the frequency range from 11 to 25 GHz.

From V. Bilik, et al. "A new extremely wideband lumped six-port reflectometer" European Microwave Conference 1991, pp. 1473-1477 and the idea of using Wheatstone Bridges and resistive structures for reflectometer applications is known.

From j:Li, G. Bossisio, K. Wu, "Dual tone Calibration of Six-Port Junction and its application to the six-port direct digital receiver", IEEE Transactions on Microwave Theory and Techniques, vol. 40, January 1996 a six-port reflectometer topology based on four 3 dB hybrid circuits, power dividers and attenuators is known.

From U.S. Pat. No. 5,498,969 an asymmetrical topology for a reflectometer structure featuring matched detectors and one unmatched detector is known.

From U.S. Pat. No. 4,521,728 with the title "Method and six-port network for use in determining complex reflection coefficients of microwave networks" a reflectometer six-port topology is known comprising two different quadrate hybrids, phase shifter, two power dividers and one directional coupler for which the realization by a microstrip line technology is disclosed.

From EP-A-0 805 561 a method for implementing a direct conversion receiver with a six-port junction is known. According to this known technique, modulated transmitted modulation is received by a direct conversion receiver which comprises a six-port junction. The demodulation is carried out analogically.

From EP-A-0 841 756 a correlator circuit for a six-port receiver is known. In this correlator circuit the received signal is summed up with a local oscillator signal at various phase angles, wherein the phase rotation between the local oscillator and RF signals is carried out separately from the summing of the correlator outputs.

To be more specific, according to the present invention a modulation identification device having a first input for a modulated RF signal to be identified and a second input for a second RF signal having a frequency essentially corresponding to the carrier frequency of the modulated RF signal is provided. The modulation identification device furthermore has an output for a flag indicating a modulation type identified. The device comprises a n-port junction, n being an integer equal to or larger than three. The n-port junction is supplied to the modulated RF signal and the second RF signal and is designed to output at least one third RF signal to at least one power detector. A signal processing unit is provided to process the output of the power detector to generate the at least one flag.

A unit for averaging at least one branch of the output of the power detector over a predetermined number of symbols can be provided.

The signal processing unit can comprise at least one comparison unit for comparing a processed output of the at least one power detector with at least one predetermined threshold.

The at least one predetermined threshold can be calculated on the basis of at least one relative power ratio. The relative power ratio is the ratio of the current processed output of the at least one power detector and an average processed output of the at least one power detector.

The signal processing unit can furthermore comprise at least one counter for counting the number of hits for which the processed output of the at least power detector satisfies at least one predetermined comparison condition, the comparison condition being calculated based on the at least one threshold.

The signal processing unit can comprise a calculation unit for calculating a probability for each modulation type to be identified on the basis of the number of hits.

The signal processing unit can be designed to output a flag for an identified modulation type in case the corresponding calculated probability exceeds a predetermined probability threshold.

The signal processing unit can be provided with an input for a-priori information on the symbol duration of the modulated RF signal.

According to another aspect of the present invention a software deemed radio device is proposed comprising a modulation identification device as set forth above.

According to a still further aspect of the present invention a method for identifying the modulation type of a wirelessly transmitted modulated RF signal is proposed. The modulated RF signal (to be identified) and a second RF signal having a frequency essentially corresponding to the carrier frequency of the modulated RF signal are supplied to the input of a n-port junction outputting at least one RF signal, n being an integer larger than three. The at least one output RF signal of the n-port junction is processed to generate at least one flag indicating the identified modulation type of the modulated RF signal.

At least one branch of the output of the n-port junction can be averaged over a predetermined number of symbols.

The step of signal processing can comprise the step of comparing a processed output of the n-port junction with at least one predetermined threshold.

The step of signal processing can furthermore comprise the step of counting the number of hits for which the processed output of the n-port junction satisfies at least one predetermined comparison condition.

The step of signal processing can furthermore comprise the step of calculating a probability for each modulation type to be identified on the basis of the number of hits.

The step of signal processing can furthermore comprise the step of outputting a flag for a identified modulation type in case the corresponding calculated probability exceeds a predetermined probability threshold.

According to a still further aspect of the present invention a n-port junction device having two RF inputs and at least one RF output for identifying the modulation type of a wireless transmitted modulated RF signal supplied to a first of the two RF inputs is used. In line with this use of an n-port junction device, n being an integer larger than three, the modulation type can be identified without a-priori knowledge of the modulation type.

Further objects, advantages and features of the present invention will become evident for the man skilled in the art when reading the following detailed description of embodiments of the present invention, taken in conjunction with the figures of the enclosed drawings.

Figure 2:
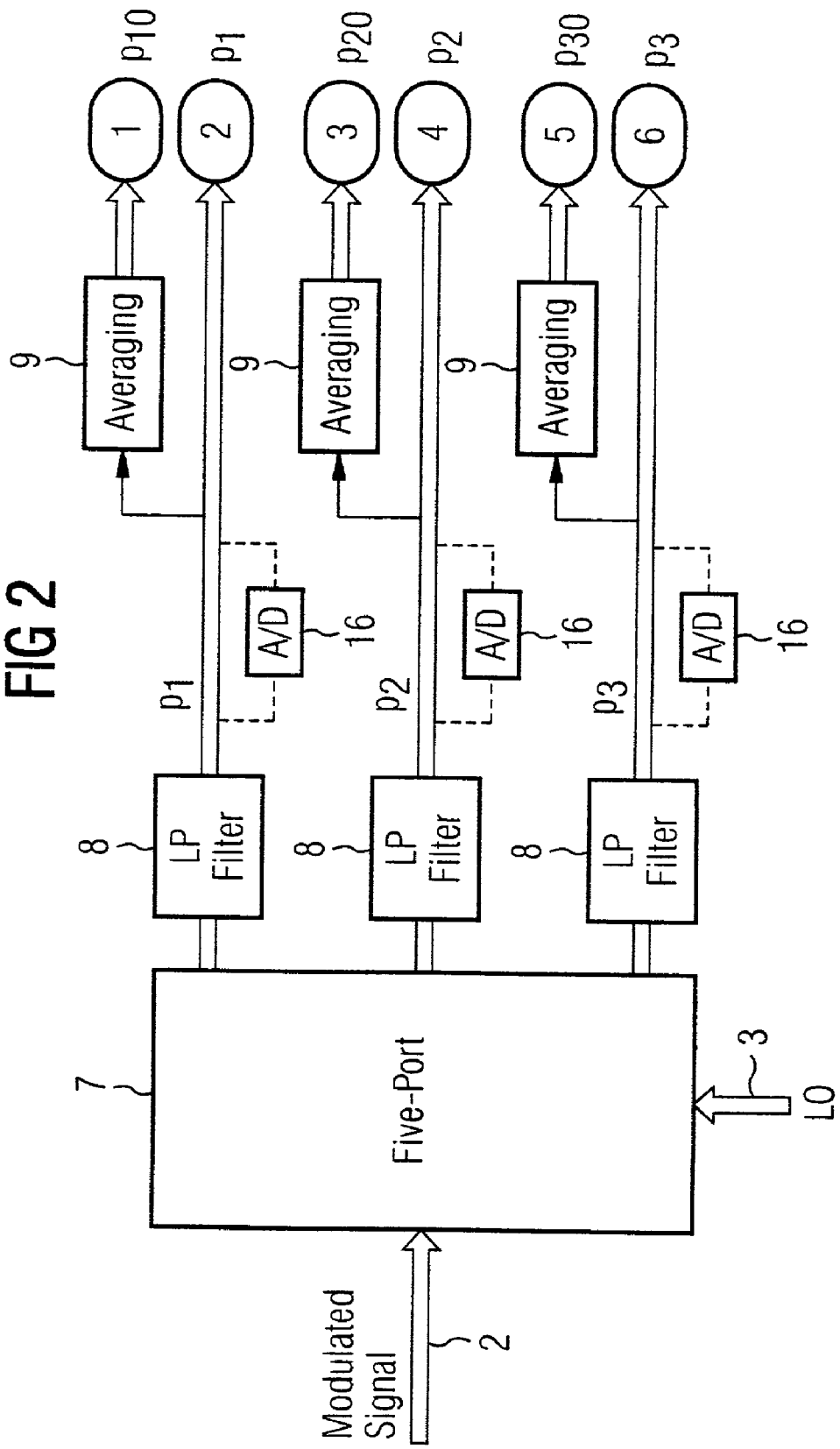
Figure 3:
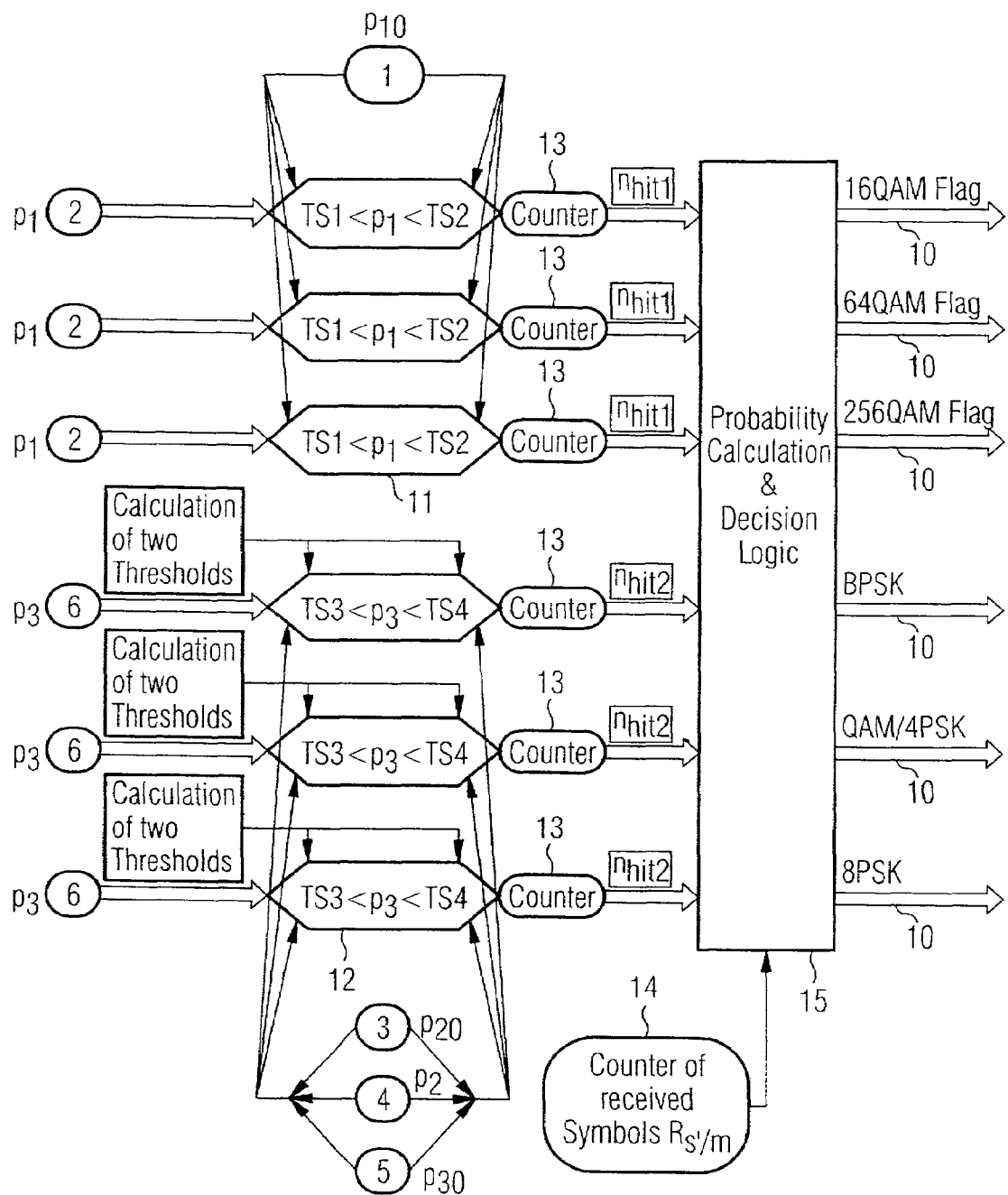
Figure 4:
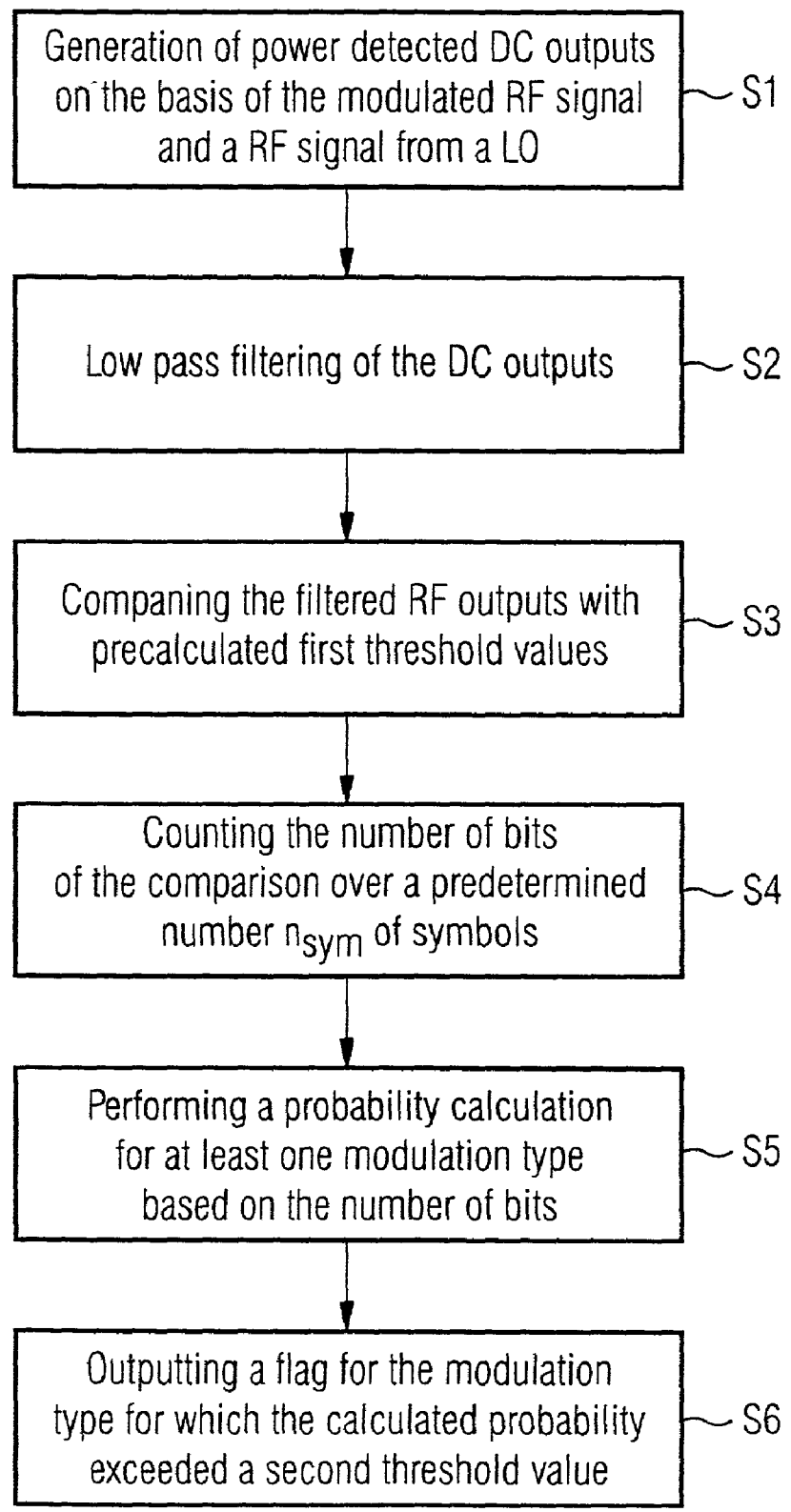
Figures 5A, 5B:
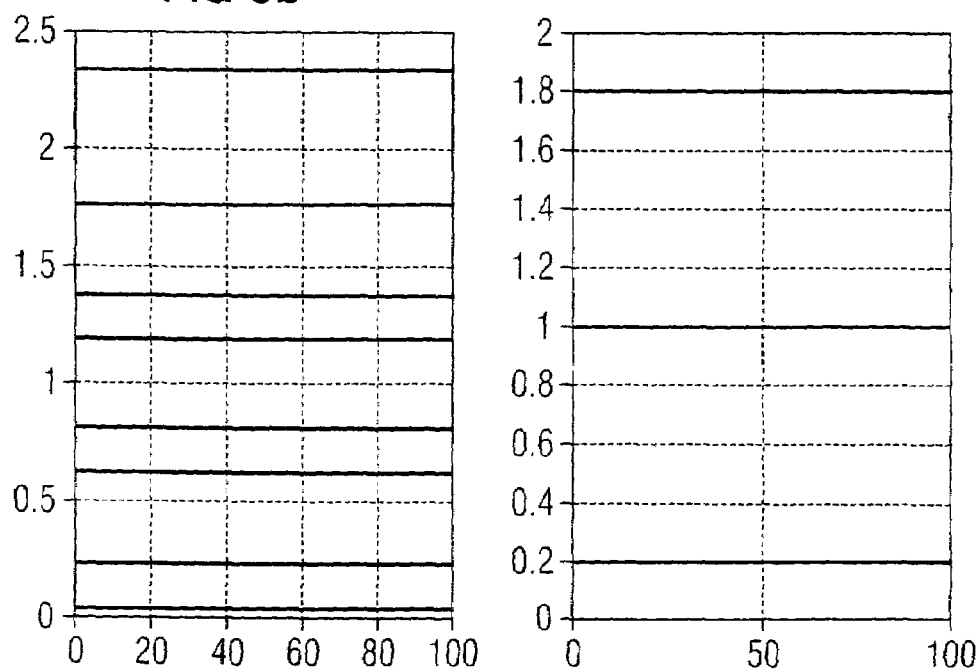

FIG. 1 shows a schematic representation of a modulation identification device,

FIG. 2 shows a first portion of the signal path in a modulation identification device as shown in FIG. 1, FIG. 3 shows a second part of the signal path and signal processing following the signal path as shown in FIG. 2, FIG. 4 shows a flow chart of the signal processing, FIG. 5a shows a table of relative power levels in the case of a 64 QAM and a 16 QAM, respectively, FIG. 5b shows a graphical representation of the relative power levels for 64 QAM and 16 QAM, FIG. 6 shows the response of a modulation identification device according to the present invention for a 16 QAM detection versus other modulation schemes, and FIG. 7 shows the sensitivity of a modulation detection, wherein a probability of 0.65 has been set for the flag activation.

With reference to FIG. 1 a general overview of a modulation identification device according to the present invention is given. Generally speaking, a modulated RF signal 2 is input into the modulation identification device 1 and the modulation identification device 1 outputs a flag 10 for a detected modulation scheme which has been used for the transmission of the modulated RF signal input in the modulation identification device 1.

Furthermore, a second RF signal having a frequency essentially corresponding to the carrier frequency of the modulated RF signal is input 3 to the modulation identification device 1.

The modulation identification device 1 generally comprises two portions, the first part 5 comprising an n-port junction 17 (n being an integer larger than two) and at least one power detector 18 detecting the power of RF output signals of the n-port junction 17. As it is known from the prior art, the n-port junction 17 combines the two RF signals 2, 3 in a linear manner (without RF mixing or other non-linear processing) and outputs RF signals to the power detector(s) 18.

Regarding the internal structure and possible implementations of the n-port junction, reference is made explicitly to WO 99/33166 with the title "N-port direct receiver".

The at least one power detector 18 supplies a power detection signal to a signal processing unit 6. Additionally the signal processing unit 6 can be provided with information 4 regarding the symbol duration of the modulated RF signal 2. The signal processing unit 6 can perform digital, analog or hybrid (both digital and analog) processing. Depending on the result of the signal processing of the signal processing unit 6, a flag "raised" for the modulation scheme, which is assumed to be used for the transmission of the modulated RF signal 2.

As can be seen from the general overview of FIG. 1, such a modulation identification device can detect a modulation type without a-priori information on the modulation scheme used for the transmission of the modulated RF signal 2.

Therefore, a modulation identification device according to the present invention can satisfy the following requirements:
  a) identification of modulation type can be done directly at RF frequency with minimum number of RF elements and without intermediate frequency stages,
  b) I/Q values are not necessarily calculated,
  c) the digital/analog/hybrid processing effort is acceptable, and
  d) even in severe S/N conditions phase locked modulation types can be identified with acceptable probability.

FIG. 2 shows a first part of the signal path of a modulation identification device 1 as shown in FIG. 1. According to this example, the n-port junction device 17 is a five-port junction 7 having two inputs 2, 3 and three outputs. The output signals of the five-port junction 7 are respectively passed through a low-pass-filter 8. After the low-pass-filtering 8 the low-pass-filtered output signals of the five-port junction device 7 can be optionally A/D-converted 16. The three low-pass-filtered output signals $P_1$, $P_2$, $P_3$ are split up respectively in two branches, wherein a first branch of the output signals is passed through a averaging unit 9 for averaging the corresponding low-pass-filtered signal $P_1$, $P_2$ or $P_3$ over a predetermined number of symbols to generate respectively a averaged signal $P_{10}$, $P_{20}$ and $P_{30}$. Therefore, in the case of a five-port junction device 7 having three outputs, in total six signals can be used for the further processing shown in FIG. 3, i.e. the current signals $P_1$, $P_2$ and $P_3$ as well as the average signals $P_{10}$, $P_{20}$ and $P_{30}$.

FIG. 3 shows the signal processing following the signal path of FIG. 2 and which takes essentially place in the signal processing unit 6.

As will be seen from FIG. 3, the current and averaged output signals $P_1$, $P_{10}$, $P_2$, $P_{20}$, $P_3$ and $P_{30}$ are used to set up conditions by calculated threshold values TS1, TS2, TS3, TS4. For each received symbol it is checked whether the current low-pass-filtered power signals $P_1$ and $P_3$ satisfy respectively the following condition:

$$TS1 < p_1 < TS2$$

$$TS3 < p_3 < TS4$$

The digital processing unit 6 comprises a counter 13 counting the number $n_{hit}$ of so-called hits, i.e. the number of symbols for which the corresponding threshold condition had been satisfied by the corresponding current signal $P_1$ or $P_3$. The number of hits is forwarded to a probability calculation and decision logic 15 in the signal processing unit 6. Furthermore a counter for counting the total number of received symbols $n_{sym}$ 14 is provided supplying the corresponding information $n_{sym}$ to the probability calculation and decision logic 15. The probability calculation and decision logic 15 performs a probability calculation and a decision logic process which will be explained later on. Based on the probability calculation and the decision logic in the unit 15 the corresponding flag 10, i.e. the flag for which the decision based on the probability calculation had a positive result, is "raised".

With reference to the flow chart of FIG. 4 the processing according to the present invention is shortly summarized:

In a step S1 the DC outputs representing the magnitude of linear combinations of the modulated RF signal and the second RF signal (from a local oscillator) are generated.

In a step S2 the DC outputs (of the n-port junction) are low-pass-filtered.

In a step S3 the low-pass-filtered power detected DC outputs are compared with pre-calculated first threshold values.

In a step S4 the number of hits $n_{hit}$ of the comparison step S3 is counted over a predetermined number $n_{sym}$ of symbols.

In a step S5 a probability calculation for at least one modulation type based on the number of hits of step S4 is performed.

Finally, a flag for the modulation type is output for which the calculated probability exceeded a second threshold value.

In the following the theoretical background of the present invention will be explained.

Method of Operation

The modulated RF signal to be identified and the LO signal are supplied to the input of the n-port junction device. As a result of the combination of the LO signal with different phase rotation with modulated RF signal, three RF outputs are provided, which are supplied to power detectors detecting the power levels of $p_1$, $p_2$ and $p_3$. Those signals are passing through low-pass-filters. These DC signals may be A/D converted. Alternatively the DC signals are respectively split in two branches whereoin one branch is analog averaged and supplied together with the non-averaged signals to a analog/digital conversion unit. Generally, this six informations (direct signals and averaged signals) are further processed by analog or digital means of the signal processing unit. Signal denoted with "1" is sufficient for setting comparison thresholds for m QAM signals, where "m" takes values of 16, 64 and 256. Signals denoted by "3", "4" and "5" are required for setting thresholds for nPSK type of signals, where "n" takes values of 2, 4, 8 or 16.

QAM Modulation Identification

Typical examples of the 16 QAM and 64QAM modulation schemes are presented in FIG. 5a. Relative power ratios (of the average power and present power at "five-port" receiver port ($p_1$), are playing a major role in definition of the decision thresholds. Relative power levels ($p_1$), are presented in FIG. 5a for 16 QAM and 64 QAM.

Thresholds TS1 is placed at one half of the distance between highest magnitude level and one the first intermediate lower magnitude level for related modulation. Threshold TS2 is higher than highest magnitude level for the same distance. For all related m QAM modulations, current pi value has to be compared with related sets of TS1 and TS2 thresholds, and if the "hit" is achieved, a counter for related type of m QAM modulation is incremented. The values of $r_1$ and $r_2$ relate to FIG. 5a.

$$TS1 = \left(\frac{3\sqrt{r_1} + \sqrt{r_2}}{4}\right)^2 \quad (1)$$

$$TS2 = \left(\frac{5\sqrt{r_1} + \sqrt{r_2}}{4}\right)^2 \quad (2)$$

mPSK Modulation Identification

In the following equations average power levels for $p_2$ and $p_3$ are presented.

$$p_1 = k_{11}^2 P_{RF} \quad (3)$$

$$p_2 = k_{21}^2 P_{RF} + k_{22}^2 P_{LO} + 2k_{21}k_{22}\sqrt{P_{RF}P_{LO}}\cos(\varphi+\theta) \quad (4)$$

$$p_3 = k_{31}^2 P_{RF} + k_{32}^2 P_{LO} + 2k_{31}k_{32}\sqrt{P_{RF}P_{LO}}\cos(\varphi-\theta) \quad (5)$$

$$p_{20} = \text{mean}(p_2) = k_{21}^2 P_{RF} + k_{22}^2 P_{LO} = (0.17361 \text{ example for specific five port structure}) \quad (6)$$

$$p_{30} = \text{mean}(p_3) = k_{31}^2 P_{RF} + k_{32}^2 P_{LO} = (0.27778 \text{ example for specific five port structure}) \quad (7)$$

Thresholds TS3 and TS4 are determined by actual power level ($p_2$), average power level of the input signal and detector device specific constants.

For each phase modulation (m PSK) sets of thresholds are available.

$$TS3 = p_{30} + (p_2 - p_{20})\tan(\alpha_1) \quad (8)$$

$$TS4 = p_{30} + (p_2 - p_{20})\tan(\alpha_2) \quad (9)$$

where we have:

$$\alpha_1 = \theta + (2q+1)\frac{\pi}{m} - \frac{\pi}{2m} \quad (10)$$

$$\alpha_2 = \theta + (2q+1)\frac{\pi}{m} + \frac{\pi}{2m} \quad (11)$$

Note that,

"m" is related to art of "m" PSK modulation.

In table 1 possible example of angels for mPSK modulations are presented.

TABLE 1

Proposed threshold angles for phase modulations

|  | q = m/4 | $\alpha_1[°]$ | $\alpha_2[°]$ |
|---|---|---|---|
| BPSK | ½ | 180 | 270 |
| QPSK | 1 | 157.5 | 202.5 |
| 8PSK | 2 | 146.25 | 168.75 |
| 16PSK | 4 | 140.625 | 151.875 |

It should be denoted that very simple numerical approach for angle positioning for mPSK is proposed, in order to minimize processing efforts. Moreover, it is proposed to utilize different detection areas for mPSK modulation types or for each particular modulation art.

Note that specific nonlinear thresholds may be defined in order to further improve detection sensitivity. However, additional processing is required, which does not necessarily justify improvement in sensitivity.

Probability Calculation

In the following equations information expression for probability calculation is presented for both: mPSK and m QAM type of modulations.

$$P_{mPSK} = 1 - \left|1 - m \cdot \frac{n_{hit2}}{n_{sym}}\right|,$$

$n_{hit2}$ – Number of hits in $(p_2 p_3)$ – area $$P_{mQAM} = 1 - \left|1 - \frac{m}{4} \cdot \frac{n_{hit1}}{n_{sym}}\right|,$$

$n_{hit1}$ – Number of hits in $p_1$ – area $n_{sym}$ – Number of symbols

Note we found out that probability of 0.65 may be sufficient to "raise the flag" that modulation is locked.

Simulation Results

Simulation results are performed in respect to classic "five-port" structure. In all calculation ideal "five-port" structure with phase shift of 45 degrees are considered.

TABLE 2

Required S/N for probability of modulation identification for different modulation types

|  | Probability: | | | | | | | |
|---|---|---|---|---|---|---|---|---|
|  | P = 0.65 | | P = 0.75 | | P = 0.85 | | P = 0.95 | |
| Modulation: | S/N (1) | S/N (2) | S/N (1) | S/N (2) | S/N (1) | S/N (2) | S/N (1) | S/N (2) |
| BPSK | −5 | −2.5 | −2 | 0.5 | 1 | 3 | 4 | 6 |
| QPSK | 3 | 4 | 6 | 6.5 | 8 | 8.5 | 11 | 11.5 |
| 8PSK | 7.5 | 11 | 10.5 | 12.5 | 12.5 | 14 | 15 | 17 |
| 16PSK | 15 |  | 17 |  | 18.5 |  | 21.5 |  |
| 16QAM | 12.5 | 14 | 14.5 | 16 | 17 | 17.5 | 19 | 19.5 |
| 64QAM | 18 | 21.5 | 21 | 22.5 | 23 | 24 | 25 | 26 |

The invention claimed is:

1. A modulation identification device having a first input for a modulated RF signal to be identified, a second input for a second RF signal having a frequency essentially corresponding to a carrier frequency of the modulated RF signal and at least one output for a flag indicating a modulation identified, wherein the device comprises:
   a n-port junction, n being an integer equal to or larger than three, being supplied with the modulated RF signal and the second RF signal and outputting at least one third RF signal to at least one power detector;
   a signal processing unit for processing an output of the power detector to generate the at least one flag; and
   a unit for averaging at least one branch of the output of the power detector over a predetermined number of symbols before the output of the power detector is supplied to the signal processing unit.

2. The modulation identification device according to claim 1, wherein the signal processing unit comprises at least one comparison unit for comparing a processed output of the at least one power detector with at least one predetermined threshold.

3. The modulation identification device according to claim 1, wherein the signal processing unit is provided with an input for a-priori information on a symbol duration of the modulated RF signal.

4. A software defined radio device, comprising a modulation identification device according to claim 1.

5. A modulation identification device having a first input for a modulated RF signal to be identified, a second input for a second RF signal having a frequency essentially corresponding to a carrier frequency of the modulated RF signal and at least one output for a flag indicating a modulation identified, wherein the device comprises:
   a n-port junction, n being an integer equal to or larger than three, being supplied with the modulated RF signal and the second RF signal and outputting at least one third RF signal to at least one power detector; and
   a signal processing unit for processing the output of the power detector to generate the at least one flag, wherein
   the signal processing unit comprises at least one comparison unit for comparing a processed output of the at least one power detector with at least one predetermined threshold, and
   the at least one predetermined threshold is calculated on a basis of at least one relative power ratio, the relative power ratio being a ratio of a current processed output of the at least one power detector and an average processed output of the at least one power detector.

6. A modulation identification device having a first input for a modulated RF signal to be identified, a second input for a second RF signal having a frequency essentially corresponding to a carrier frequency of the modulated RF signal and at least one output for a flag indicating a modulation identified, wherein the device comprises:

a n-port junction, n being an integer equal to or larger than three, being supplied with the modulated RF signal and the second RF signal and outputting at least one third RF signal to at least one power detector; and a signal processing unit for processing an output of the power detector to generate the at least one flag, wherein the signal Processing unit comprises at least one comparison unit for comparing a processed output of the at least one power detector with at least one predetermined threshold, and the signal processing unit comprises at least one counter for counting a number ($n_{hit}$) of hits for which the processed output of the at least one power detector satisfies at least one predetermined comparison condition, the at least one predetermined comparison condition being based on the at least one predetermined threshold.

7. The modulation identification device according to claim 6, wherein the signal processing unit comprises a calculation unit for calculating a probability for a modulation to be identified on a basis of the number of hits.

8. The modulation identification device according to claim 7, wherein the signal processing unit is configured to output a flag for an identified modulation in case a corresponding calculated probability exceeds a predetermined probability threshold.

9. A method for identifying a modulation of a wirelessly transmitted modulated RF signal, the method comprising the following steps:

supplying the modulated RF signal and a second RF signal having a frequency essentially corresponding to a carrier frequency of the modulated RF signal respectively to an input of a n-port junction outputting at least one output RF signal, n being an integer larger than three; and signal processing the at least one output RF signal of the n-port junction to generate at least one flag indicating the identified modulation of the modulated RF signal, wherein at least one branch of the output of the n-port junction is averaged over a predetermined number of symbols.

10. The method according to claim 9, wherein the signal processing comprises comparing a processed output of the n-port junction with at least one predetermined threshold.

11. A method for identifying a modulation of a wirelessly transmitted modulated RF signal, the method comprising:

supplying the modulated RF signal and a second RF signal having a frequency essentially corresponding to a carrier frequency of the modulated RF signal respectively to an input of a n-port junction outputting at least one output RF signal, n being an integer larger than three; and signal processing the at least one output RF signal of the n-port junction to generate at least one flag indicating the identified modulation of the modulated RE signal, wherein the signal Processing comprises comparing a processed output of the n-port junction with at least one predetermined threshold, and the signal processing furthermore comprises counting a number of hits for which the processed output of the n-port junction satisfies at least one predetermined comparison condition.

12. The method according to claim 11, wherein the signal processing further comprises calculating a probability for a modulation to be identified on the basis of the number of hits.

13. The method according to claim 12, wherein the signal processing further comprises outputting a flag for an identified modulation in case a corresponding calculated probability exceeds a predetermined probability threshold.

* * * * *